United States Patent Office 3,358,040
Patented Dec. 12, 1967

3,358,040
BIPHENYL DERIVATIVES
Matthew A. McMahon, Jr., Hopewell Junction, N.Y., assignor to Texaco Inc., New York, N.Y., a corporation of Delaware
No Drawing. Filed June 15, 1964, Ser. No. 375,290
5 Claims. (Cl. 260—613)

This invention relates to novel compounds of matter. More particularly, it pertains to biphenyl compounds of the formula:

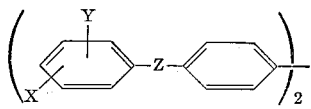

where Z is a member selected from the group consisting of sulfur and oxygen, where X and Y are radicals selected from the group consisting of Br, Cl, F and hydrogen with at least one of the X and Y radicals being halogen. The invention also relates to a novel method of preparing biphenyl compounds including the biphenyl compounds of the invention.

The biphenyl compounds contemplated herein are useful as precursors to polyaromatic compounds of a molecular weight of between about 400 and 1000. The polyaromatic derivatives of the novel biphenyl compounds are useful as thermally stable lubricants. The reaction of the biphenyl precursor to form the polyaromatic lubricants, is accomplished by standard means such as via the Ulmann reaction.

The novel biphenyl compounds are prepared by reacting mono- or di-substituted diphenyl ethers of the formula:

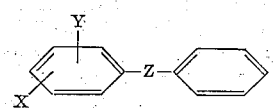

with a cupric halide, in the presence of aluminum halide catalyst and inert solvent. The cupric and aluminum halides contemplated herein are cupric chloride, cupric bromide, aluminum chloride and aluminum bromide.

The reaction can be further described by the following equation using p-chlorodiphenyl ether and cupric chloride as the reactants and aluminum chloride as the catalyst:

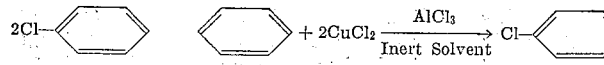

Under advantageous conditions the reaction is conducted at a temperature between about —20 and 100° C., preferably between about —5 and +15° C. In addition, under advantageous conditions the mole ratio of reactants and catalyst, that is, the diphenyl ether to copper halide to aluminum halide is between about 1:1:1 and 1:1:4, preferably between 1:1:1 and 1:1:3.

When reaction temperatures above about 100° C. are utilized, the yields of biphenyl product are poor. Reaction temperatures below about —20° C. are too low for the reaction to be significant. In addition, reactant-catalyst ratios outside the aforedescribed range give either very low yield of product or result in the use of an unnecessary excess of reactant and/or catalyst material.

Another advantageous aspect in the method of preparing the biphenyl compounds of the invention is the employment of inert liquid solvent for reactants and catalyst. The inert solvent functions to facilitate the interaction between the catalyst and reactants which results in substantially higher yields. Examples of the inert liquid solvents contemplated herein are carbon disulfide and the halogenated liquid aromatic hydrocarbons having boiling points between about 50 and 250° C. Specific examples of the halogenated liquid aromatic hydrocarbons contemplated herein are o-dichlorobenzene, chlorobenzene, 1,2,4-trichlorobenzene, bromobenzene and fluorobenzene. It is to be noted that some of the aforementioned solvents, although listed as suitable are not suitable for all temperatures in the contemplated reaction temperature range of between about —20 and 100° C. For example, 1,2,4-trichlorobenzene is a solid at about 18° C. Therefore, the temperature of the reaction utilizing this solvent would obviously have to be above about 18° C.

The biphenyl product may be recovered and purified by standard means such as filtration, sublimation and recrystallization.

Specific examples of the substituted diphenyl ether reactants contemplated herein employed to form the novel biphenyl compounds are p-chlorodiphenyl ether, p-bromodiphenyl ether, m-chlorodiphenyl ether, p-fluorodiphenyl ether, 3,4-dichlorodiphenyl ether, 2,4-dibromodiphenyl ether, p-chlorodiphenyl thioether, p-bromodiphenyl thioether, m-chlorodiphenyl thioether, p-fluorodiphenyl thioether, 3,4-dichlorodiphenyl thioether, and 2,4-dibromodiphenyl thioether.

Specific examples of the novel biphenyl compound contemplated herein are 4,4'-bis(p-chlorophenoxy)biphenyl, 4,4'-bis(p-bromophenoxy)biphenyl, 4,4'-bis(p-fluorophenoxy)biphenyl, 4,4'-bis(3,4-dichlorophenoxy)biphenyl, 4,4' - bis(o-chlorophenoxy)biphenyl, 4,4'-bis(2,4-dibromophenoxy)biphenyl, 4,4'-bis(p-chlorophenylmercapto)biphenyl, 4,4'-bis(p-bromophenylmercapto)biphenyl, 4,4'-bis(p-fluorophenylmercapto)biphenyl, 4,4'-bis(3,4-dichlorophenylmercapto)biphenyl and 4,4' - bis(2,4-dibromophenylmercapto)biphenyl.

In the broadest context of the method of the invention the aforedescribed procedure is also suitable to produce substituted tetraphenyl compounds of the formula:

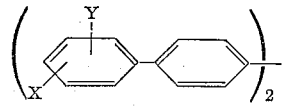

from diphenyl compounds of the formula:

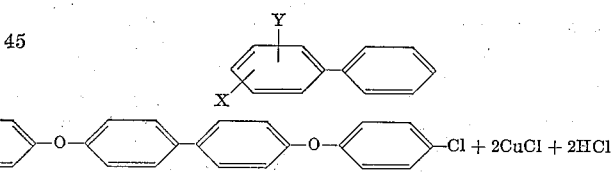

where X and Y are as heretofore defined. Specific examples of the organic reactant suitable to form the tetraphenyl products are p-chlorobiphenyl, p-bromobiphenyl, m-fluorobiphenyl, p-fluorobiphenyl, 3,4-dichlorobiphenyl, and 2,4-dibromodiphenyl. Specific examples of the tetraphenyl products are 4,4'-bis(p-chlorophenyl)biphenyl, 4,4'-bis(p-bromophenyl)biphenyl, 4,4'-bis(m-fluorophenyl)biphenyl, 4,4' - bis(p-fluorophenyl)biphenyl, 4,4'-bis (3,4-dichlorophenyl)biphenyl and 4,4'-bis(2,4-dibromophenyl)biphenyl.

Example 1

This example illustrates the preparation of the novel biphenyl compounds of the invention.

To 100 milliliters of chlorobenzene there was charged 19 grams of p-chlorodiphenyl ether, 15 grams of copper chloride and 26 grams of aluminum chloride. The mixture was maintained at 0° C. and stirred for a period of 4 hours. At the end of the 4 hour reaction period, the reaction was stopped with the addition of about 100 mls. of 2 N hydrochloric acid, the hydrochloric acid being added at such a rate that the temperature of the reaction mixture did not rise above 15° C. The mixture was transferred to a separatory funnel and the aqueous and organic layers were separated. The aqueous layer was washed with 50 mls. of benzene. This benzene, along with an additional 150 mls. of benzene, was added to the separated organic layer. The separated organic layer was washed free of acid with a saturated aqueous sodium chloride solution and 5 wt. percent aqueous sodium bicarbonate solution. The washed organic layer was dried over calcium sulfate, filtered and the solvent was distilled until 83 grams of liquid residue remained. Cooling the residue caused a 2.5 gram white crystalline residue to form. This solid was separated from the liquid residue by filtration, dried and then recrystallized from a heptane-benzene solution to give a powder which melted at 182–183° C. An infrared spectrum analysis identified the purified white powder as 4,4'-bis(p-chlorophenoxy)biphenyl of the formula:

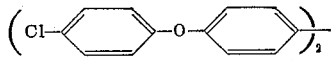

This structure was further confirmed by the following molecular weight and elemental analysis thereof:

Molecular weight: Calc. 407. Found 424.

Elemental Analysis: Calc. C, 70.8; H, 3.83; Cl, 17.4. Found: C, 71.0; H, 4.1; Cl, 17.4.

The biphenyl product was found to be soluble in benzene and chloroform and insoluble in heptane and ethyl alcohol.

*Example II*

This example further illustrates the preparation of the novel biphenyl compounds of the invention.

The procedure of Example I was repeated except in the first run (Run I) 200 mls. of chlorobenzene were utilized and the reaction time was 4 hours. In the second run (Run II) the reaction time was also 4 hours. Analysis of the product of both Runs I and II determined it to be 4,4'-bis(p-chlorophenoxy)biphenyl in a yield of 47 mole percent based on the diphenyl ether reactant.

*Example III*

This example illustrates the preparation of substituted tetraphenyl compounds.

To 100 mls. of chlorobenzene there was dissolved 10 grams of p-chlorobiphenyl followed by the addition of 12 grams of cupric chloride and 23 grams of aluminum chloride. The mixture was maintained at 27° C. and stirred for a period of 4 hours. At the end of the 4 hour period the reaction was terminated by the addition of 100 mls. of 6 N hydrochloric acid. The mixture was transferred to a separatory funnel and the aqueous and organic layer was separated. The organic layer was filtered leaving 6 grams of a white solid. The solid was washed with two 100 mls. portions of ethyl ether and then subjected to a continuous benzene extraction. The recovered white crystalline powder was subjected to infrared spectrum analysis and identified as 4,4'-bis(p-chlorophenyl)biphenyl of the formula:

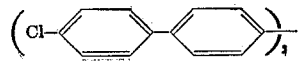

The yield on a mole basis was determined to be 76% based on an 80% conversion of the biphenyl reactant. Production of the foregoing compound was further confirmed by the following elemental analysis thereof:

Calc.: C=76.8; H, 4.3; Cl, 18.9. Found: C=75.4; H, 4.1; Cl, 18.8.

I claim:

1. 4,4'-bis(p-chlorophenoxy)biphenyl.

2. A method of preparing a biphenyl compound of the formula:

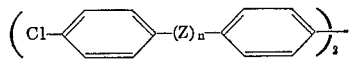

where Z is oxygen and $n$ is a whole integer from 0 to 1 comprising contacting a diphenyl compound of the formula:

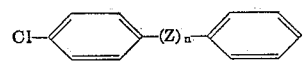

where Z and $n$ are as heretofore defined with cupric chloride in the presence of aluminum chloride in a mole ratio of said diphenyl compound to said cupric chloride to said aluminum chloride of between about 1:1:1 and 1:1:4 at a temperature between about −20 and 100° C. in the presence of an inert liquid medium.

3. A method in accordance with claim 2 wherein said inert liquid medium is selected from the group consisting of carbon disulfide and halogenated aromatic hydrocarbon of a boiling point between about 50 and 250° C.

4. A method of preparing 4,4'-bis(p-chlorophenoxy)biphenyl comprising contacting p-chlorodiphenyl ether with copper chloride in the presence of aluminum chloride at a temperature between about −20° and 100° C. and at a mole ratio of ether to cupric chloride to aluminum chloride of between about 1:1:1 and 1:1:3 and in the presence of a solvent selected from the group consisting of chlorobenzene, dichlorobenzene, trichlorobenzene, bromobenzene, fluorobenzene and carbon disulfide.

5. A method of preparing 4,4'-bis(4-chlorophenyl)biphenyl comprising contacting p-chlorobiphenyl with cupric chloride in the presence of aluminum chloride at a temperature between −20 and 100° C. at a mole ratio of p-chlorobiphenyl to cupric chloride to aluminum chloride of between about 1:1:1 and 1:1:3 and in the presence of an inert liquid medium selected from the group consisting of chlorobenzene, dichlorobenzene, trichlorobenzene, bromobenzene, fluorobenzene and carbon disulfide.

References Cited

UNITED STATES PATENTS

| | | | |
|---|---|---|---|
| 2,940,929 | 6/1960 | Diamond | 260—613 |
| 3,148,172 | 9/1964 | Fox | 260—613 XR |
| 3,221,058 | 11/1965 | Engelsma et al. | 260—612 XR |

OTHER REFERENCES

Kovacic et al.: Jour. Amer. Chem. Soc., vol. 85 (Feb. 1963), pages 454–458, QD1A5.

BERNARD HELFIN, *Primary Examiner.*